United States Patent

Mikami

[11] Patent Number: 5,194,754
[45] Date of Patent: Mar. 16, 1993

[54] HEIGHT DIFFERENCE TYPE AEROGENERATOR

[76] Inventor: Tatuya Mikami, 302 Crest-Suehiro, 2-13-20, Suehiro, Ichikawa-shi, Chiba-ken, Japan

[21] Appl. No.: 777,620

[22] Filed: Oct. 16, 1991

[30] Foreign Application Priority Data

Oct. 26, 1990 [JP] Japan .................................. 2-287131
Aug. 12, 1991 [JP] Japan .................................. 3-225292

[51] Int. Cl.⁵ .............................................. F03D 5/00
[52] U.S. Cl. ...................................... 290/55; 290/44
[58] Field of Search .................... 290/44, 55; 415/4.2, 415/4.4, 907, 909

[56] References Cited

U.S. PATENT DOCUMENTS

| | | | |
|---|---|---|---|
| 1,545,633 | 7/1925 | Bender | 415/4.4 |
| 4,070,131 | 1/1978 | Yen | 415/4.4 |
| 4,236,866 | 12/1980 | Martinez | 415/4.4 |
| 4,452,046 | 6/1984 | Valentin | 290/55 |

FOREIGN PATENT DOCUMENTS 8808336 9/1988 Fed. Rep. of Germany .

Primary Examiner—A. D. Pellinen
Assistant Examiner—Robert Lloyd Hoover
Attorney, Agent, or Firm—Nixon & Vanderhye

[57] ABSTRACT

An aerogenerator comprises a structure, a vertical rotary shaft support by the structure, an electrical power generating device directly or indirectly connected to the rotary shaft, annularly arranged floating chimneys rotatable together with the rotary shaft therearound, and blades fixed to each of the chimneys and extending radially of the rotary shaft.

6 Claims, 3 Drawing Sheets

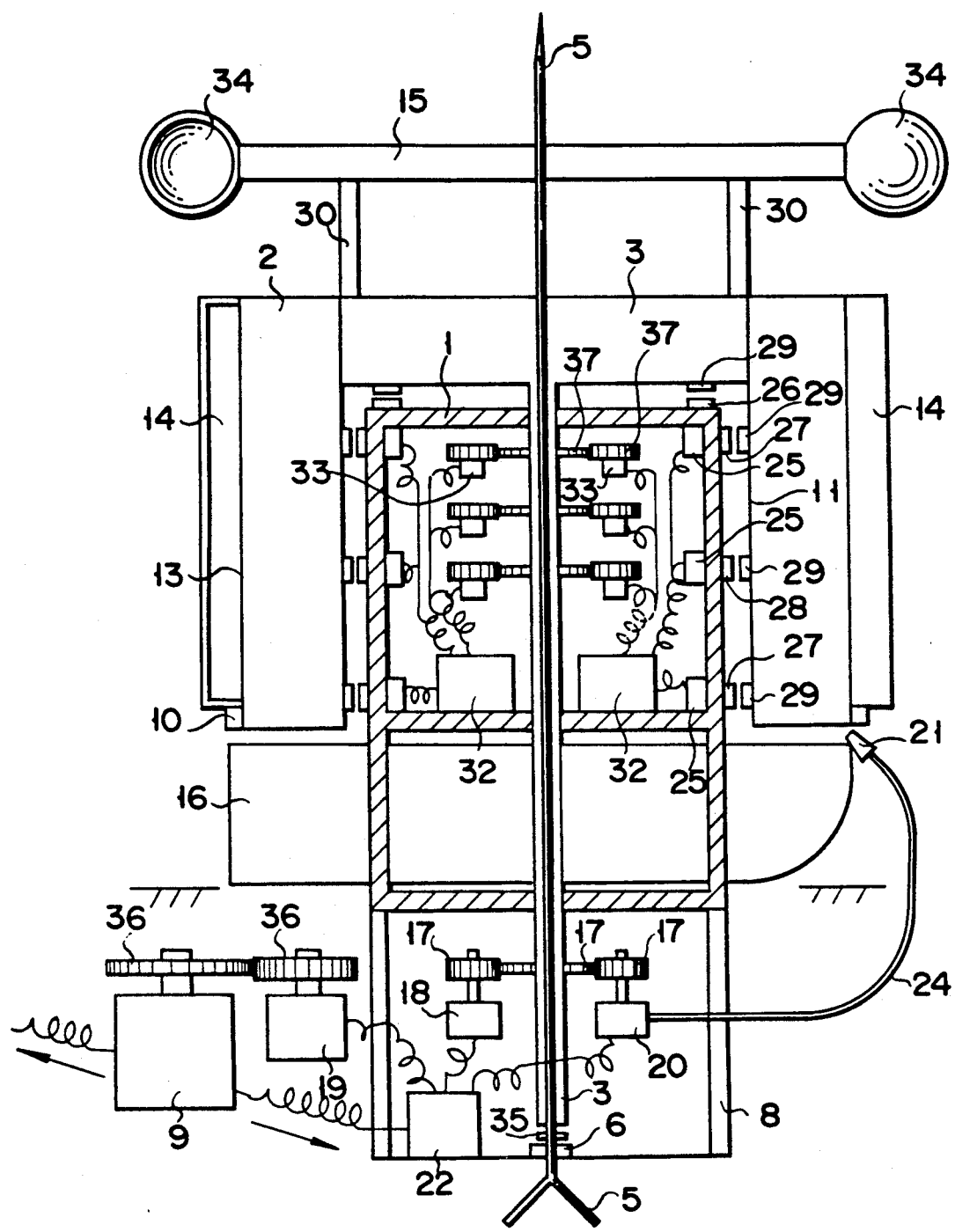
F I G. 6

HEIGHT DIFFERENCE TYPE AEROGENERATOR

BACKGROUND OF THE INVENTION

1. Field of the Invention

This invention relates to an electric power generator utilizing rising wind caused by the height difference, and more particularly to a height difference type aerogenerator.

2. Description of the Related Art

In the conventional aerogenerators, windmills are rotated only by horizontal wind to generate electric power, as disclosed in Japanese Examined Patent Application Publication No. 25-2454, Japanese Examined Utility Model Application Publication No. 36-17204 and Japanese Examined Utility Model Application Publication No. 57-7307.

Most conventional aerogenerators, which generate electric power by rotating a set of propellers by means of horizontal wind, are small. Thus, a large rotational force and large electric power cannot be obtained from them.

SUMMARY OF THE INVENTION

The first object of this invention is to provide an electric power generator which generates a large rotational force by utilizing, to a maximum, rising wind produced in a chimney and wind on the surface or in the vicinity of the ground (hereinafter referred to as the "surface wind") and wind blowing at the upper ends of chimneys (hereinafter referred to as the "upper wind") and which produces stable electric power by the stable rotational force.

The second object of this invention is to provide an electric generator which is provided with an accelerating device other than the wind means to obtain a stabler rotational force by stronger and stabler electric power.

In order to attain these objects, this invention provides a height difference type aerogenerator comprising a structure, a vertical rotary shaft supported by the structure, an electric power generating device directly or indirectly connected to the rotary shaft, a group or groups of annularly arranged floating chimneys rotating together with the rotary shaft therearound, and radially arranged blades provided on each chimney.

In each chimney, the pressure at its upper end is lower than the pressure at its lower end, and thus rising wind is always generated. The rising wind acts on the blades fixed to each chimney to produce a rotational force corresponding to the inclined angle of each blade, the vertical distance of the adjacent blades and the speed of the rising wind. In this way, the rotary shaft is driven by a forcible rotating force produced in the floating chimneys arranged in an annular manner, and large electric power can be obtained.

As the rotary shaft rotates, the annularly arranged chimneys are rotated as a body around the rotary shaft. The rotational speed of the floating chimneys is proportional to the radius of gyration. The speed of horizontal wind flowing at the upper end of each chimney varies from time to time and changes the rotational speed. In this case, the instantaneous speed at the upper end of each floating chimney is the tangential rotational speed plus/minus of the speed of the upper wind, i.e., a compound speed. The instantaneous speeds at the upper end of the floating chimneys change from floating chimney to floating chimney.

According to the principle of spraying, the speed of rising wind increases in proportional to the compound wind force. A large rotational force is obtained by a high-speed rising wind acting on the blades.

The rotational force is produced, mainly by the upward air streams in the floating chimneys, which swirl in the windward direction. Accordingly, the blades are designed under the consideration of the maximum speed of rising wind.

In order to accelerate the rising wind in the floating chimneys, a surface wind utilizing device for changing horizontal wind to rising wind is provided under the floating chimneys.

This arrangement allows surface wind to change into rising wind, thereby to accelerate the same in the floating chimneys, and a further larger rotational force can be obtained.

Further, in order to accelerate the rising wind in the floating chimneys efficiently, an upper-wind utilizing device for rectifying the upper wind and protecting rain from entering the floating chimneys is provided over the floating chimneys at a proper level by means of a support.

The upper wind is rectified and the wind speed is increased to lower the pressures further at the upper ends of the chimneys so that the speed of the rising wind in the floating chimneys is further increased.

Since the upper-wind utilizing device is also used as rain protecting means, rain, which otherwise may enter the floating chimneys and may freeze to the blades in cold time, is prevented from entering the floating chimneys, whereby the blade efficiency can be maintained in cold time.

Means for elevating the speed of the rising wind in the floating chimneys comprises an air compressor driven by the rotary shaft or an electric motor, and an injecting device provided under the floating chimneys, for injecting the air compressed by the compressor.

The elevation of the pressure at the lower end of each floating chimney increases the speed of the rising wind.

When the chimney of an incinerator is extended close to the lower end of the floating chimneys solely or together with the air injecting device, the pressure at the lower ends of the floating chimneys is increased by a high temperature exhaust gas. The speed of the rising wind is further enhanced and the chimney efficiency of the incinerator is improved.

Mean for changing an unstable rotational force of the rotary shaft to a steady driving force of the aerogenerator comprises an auxiliary electric power generating device rotated by the rotary shaft, a battery charged by means of the auxiliary electric power generating device, and an electric motor driven by the electric power from the battery so as to drive the electric power generating device in a stable manner.

Even when, therefore, the rotational force of the rotary shaft are unstable, the aerogenerator is rotated in a stable state to obtain constant electric power.

Means for stabilizing the rotational force of the rotary shaft comprises a plurality of further auxiliary power generating devices and batteries. The number of the auxiliary power generating devices is automatically selected according to the rotational speed so that the driven auxiliary electric power generating devices act as brakes to stabilize the rotational speed.

There are provided an inductive electromagnetic field generating device or a superconducting electromagnetic field generating device for floating the rotary shaft from the structure, and guiding the rotary shaft, and an inductive electromagnetic field generating device or a superconducting electromagnetic field generating device for the aerogenerator.

The inductive electromagnetic field generating devices or the superconducting electromagnetic field generating devices are driven by the electric power charged in batteries, and thus the inductive magnets or the superconducting magnets are energized so as to lift the rotary shaft from the structure, and accelerate and guide the rotary shaft.

The acceleration due to the inductive magnets or the superconducting magnets can more stabilize the rotation of the rotary shaft.

As the rotational speed of the floating chimneys is increased by the accelerating force other than the force of wind, the speed of the rising wind is gradually enhanced and the rotational speed is stabilized by means of a plurality of auxiliary electric power generating devices. The generated electric power is further charged in the batteries, accumulating more power therein. The increased battery power rotates the rotary shaft at higher speed. Hence more electric power is generated, which drive the shaft faster, achieving the second object of this invention.

When the rotational speed is increased by the force other than the force of wind, the speed of rising wind is also increased. Thus, it is necessary to supply a large amount of air to the chimneys from their lower ends. This can be attained by improving the function of an air compressor for supplying air into the chimneys. Alternately, the structure of the floating chimneys is developed so as to increase the rotational output even if a small amount of air is supplied into the floating chimneys.

All or part of the stable rotational force of the rotational shaft can be used as a driving force of the aerogenerator or as a driving force of a water pump or another driving device other than the aerogenerator. A plurality of aerogenerators of this type are combined to generate a large rotational force or large electric power, whereby a substantive large electric aerogenerator system is easily built up.

A lightning arrester projects upward from the rotary shaft so as to protect the aerogenerator from lightning.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a vertical cross-sectional view of another embodiment of the height difference type aerogenerator.

DETAILED DESCRIPTION OF THE PREFERRED EMBODIMENTS

Figure 1:
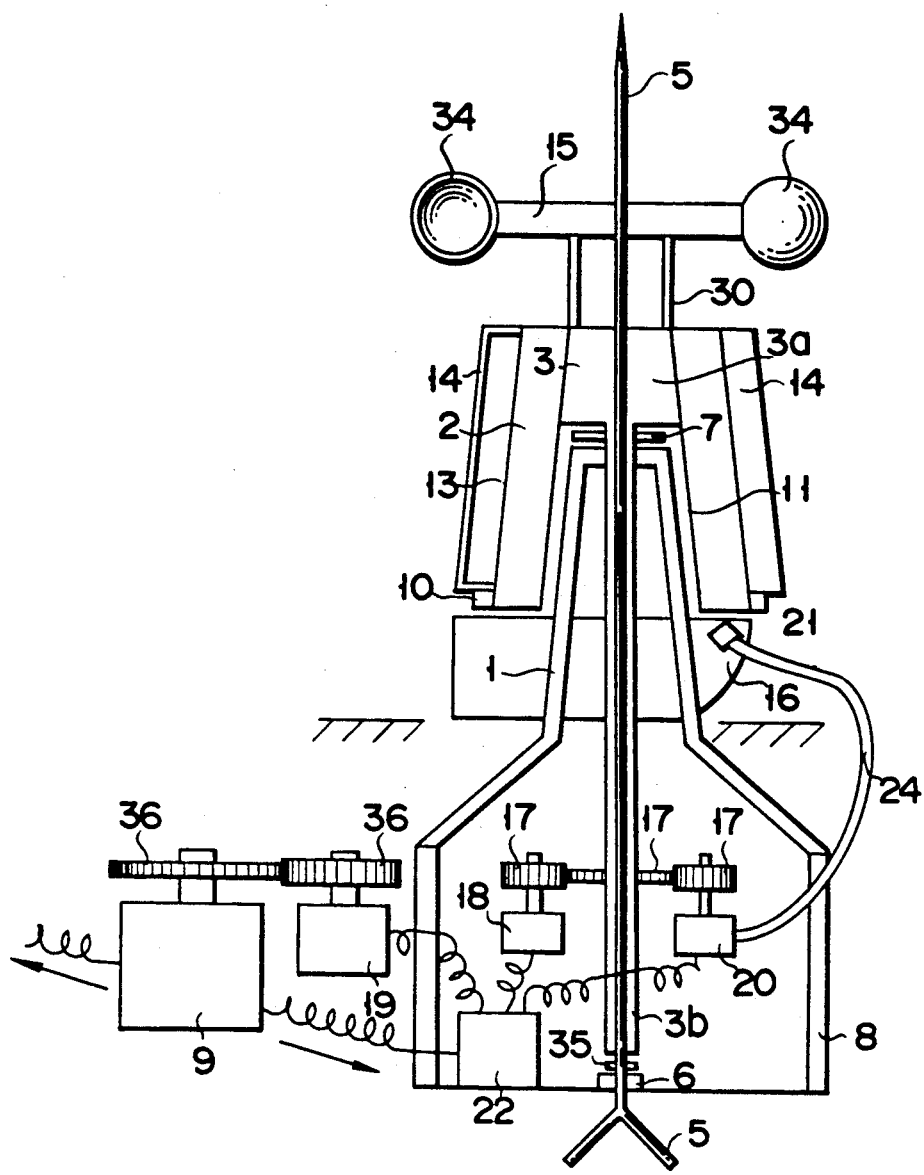
FIG. 1 is a vertical cross-sectional view of one embodiment of the height difference type aerogenerator according to this invention.

FIG. 1 shows a vertical cross-sectional view of one embodiment of the height difference type aerogenerator according to this invention, which is operated only by the force of wind.

A conical structure 1 is provided on the lateral wall, as a foundation, of a basement 8. A rotary shaft 3 having an axis is rotatably supported by a bearing 35 mounted on a support 6 fixed to the floor of the basement 8 and a bearing 7 mounted on the upper face of the structure 1.

The rotary shaft 3 has a T-shape. The wide upper portion 3a of the rotary shaft 3 is formed conical and the portion 3b of the rotary shaft 3 lower than the bearing 7 forms an elongated pipe. A lightening arrester 5 extends through the upper portion 3a and the pipe portion 3b of the rotary shaft 3.

The side wall of the upper portion 3a of the rotary shaft 3 is integrally connected to the upper portion of a cover 11 which is concentrical with the rotary shaft 3. A plurality of floating chimneys 2 (described later in detail with reference to FIGS. 2 and 3) are circumferentially arranged so as to take an annular form between the cover 11 and an outer plate 13.

To the outer peripheral wall of the outer plate 13 of the floating chimneys 13 are fixed a plurality of guide plates 14 which are rotated rightward and act as a windmill.

Under the guide plates 14, a flywheel 10 is fixed to the side wall of the outer plate 13.

Between the lower ends of the floating chimneys 2 and the ground is provided a surface-wind utilizing device 16 which opens leftward. The device 16 will be described later in detail with reference to FIG. 4. Surface wind blows through only this portion in the structure 1.

An upper-wind utilizing device 15 is provided at a proper level over the rotary shaft 3 and fixed thereto by means of a support 30.

The lower portion of the rotary shaft 3 is connected to a transmission devices 17 such as gears in the basement 8.

An air compressor 20 is connected to the right side transmission device 17. Air compressed by the compressor 20 passes through a pipe 24 and is jetted from an injecting device 21 provided under the floating chimneys 2.

A auxiliary electric power generating device 18 is connected to the left side transmission device 17. Electric power generated by the auxiliary electric power generating device 18 is charged in a battery 22.

The battery 22 is electrically connected to an electric motor 19. The transmission device 36 of the electric motor 19 is connected to the transmission device 36 of a corresponding electric power generating device 9. Part of electric energy generated from the electric power generating device 9 and excess electric energy generated therefrom at night time and holidays are stored in the battery 22. The rotational force of the rotary shaft 3 may be directly used as the driving force of the electric power generating device 9. Alternatively, the rotational force of the rotary shaft 3 may be used as a driving force of a water pump or another driving device other than the electric power generator.

The generator according to this invention can be used, solely or together with electric power generator, as a wind forming apparatus of the chimney of, such as, an incinerator, when the chimney of the wind forming apparatus is extended close to the lower ends of the chimneys of the generator of this invention.

Instead of driving the air compressor 20 by means of the transmission device 17, it may be driven by an electric motor (not shown) which is rotated by the battery 22.

The floating chimneys 2 will now be described in detail with reference to FIGS. 2 and 3.

Around the rotary shaft 3 are formed three annular layers of floating chimneys 2, each layer comprising chimneys 2 arranged circumferentially of the layer. Eight guide plates 14 rotatable rightward are fixed to the outer peripheral surface of the floating chimney assembly so as to act as a windmill. When the chimney assembly starts to rotate, the guide plates 14 are effectively operated to drive the chimney assembly, but they act as flywheels when the chimney assembly rotates at a speed more than the speed of horizontal wind. Thus, they can be omitted.

The first layer consists of four floating chimneys defined by a cover 11 extending from the side wall of the rotary shaft 3, another cover 11a coaxial therewith and four partition plates 12, so as to be arranged in an annular manner. The second layer consists of six floating chimneys 2 defined by the cover 11a, a cover 11b coaxial therewith and six partition plates 12, so as to be arranged in an annular fashion. The third layer consists of eight floating chimneys 2 defined by the cover 11b, an outer plate 13 and eight partition plates 12, so as to be arranged in an annular manner.

Each of the chimneys 2 arranged in an annular manner has a sectorial cross section, but may have a circular cross section or a cross section of another suitable shape.

In each floating chimney 2 are provided five blades 4 separated vertically from one after another and extending radially of the rotary shaft 3. The blades 4 may be arranged in a plurality of vertical rows in each floating chimney 2. Further, the blades 4 are arranged adjacent to the respective partition plates 12.

Figure 4:
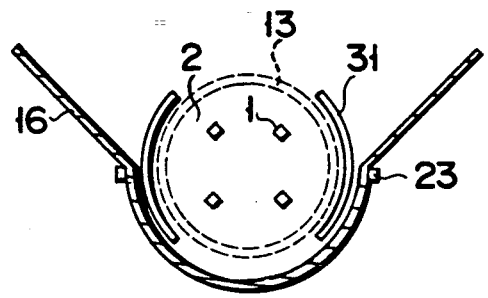
FIG. 4 is a transverse cross-sectional view of a wind surface utilizing device of this embodiment.

In FIG. 4 is shown a transverse cross-sectional view of the surface-wind utilizing device 16 which changes surface wind to rising wind.

The surface-wind utilizing device 16 is provided between the lower ends of the floating chimneys 2 and the surface of the ground. The main body of the surface-wind utilizing device 16 is provided, on both side ends of its semicircular portion, with openings which are automatically turned toward the wind direction by means of a moving device 23. A shutter is provided to be opened and closed. The shutter comprises a pair of segments 31, which are two of the four segments of the same size made by dividing a hollow cylinder. When the aerogenerator according to this invention is operated, the shutters 31 are opened. On the other hand, when the aerogenerator is not operated, the shutters 31 are closed so as to prevent rising wind.

Figure 5:
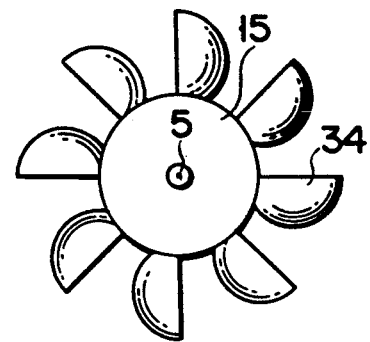
FIG. 5 is a plan view of an upper wind utilizing device of this embodiment.

In FIG. 5 is shown a plan view of the upper-wind utilizing device 15 which rectifies upper-wind over the floating chimneys 2 and prohibits the freezing of rain in the floating chimneys 2.

The upper-wind utilizing device 15 has a disc shape, through the center of which the lightening arrester 5 penetrates On the outer peripheral surface are provided guide plates 34 acting as a windmill and rotatable rightward. When the chimney assembly starts to rotate, the guide plates 34 are effectively operated to drive the chimney assembly, but they act as flywheels when the chimney assembly rotates at a speed more than the speed of horizontal wind. Thus, they can be omitted.

Another embodiment of this invention in which accelerating means other than wind is used will now be described with reference to FIG. 6.

A structure 1 is a cylindrical building built on the side walls of a basement 8 as a foundation and has a floor at the center thereof.

A T-shaped rotary shaft 3 concentrically extends through the structure 1 and is rotatably supported by means of a bearing 35 mounted on a support 6 fixed to the floor of the basement 8.

A lightening arrester 5 extends through the T-shaped rotary shaft 3.

The upper face of the structure 1 faces the lower face of the wide upper portion of the T-shaped rotary shaft 3. The peripheral wall of the wide upper portion of the rotary shaft 3 is connected integrally with the upper end of a cover 11 coaxial with the rotary shaft 3, similarly to the case shown in FIGS. 2 and 3.

Figure 2:
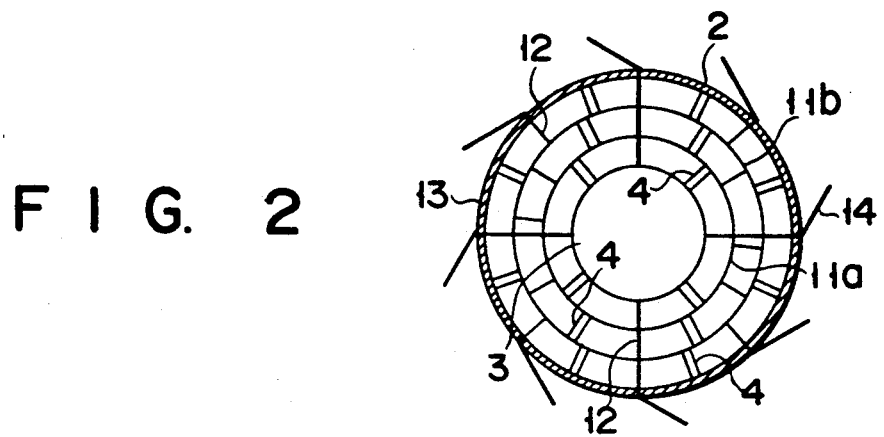
FIG. 2 is a transverse cross-sectional view of floating chimneys of this embodiment.
Figure 3:
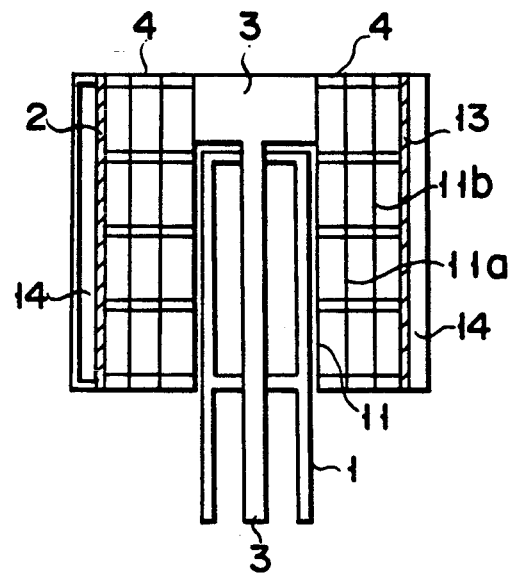
FIG. 3 is a vertical cross-sectional view of the floating chimneys of FIG. 2.

Floating chimneys 2 have the same structure and the arrangement as those of the embodiment shown in FIGS. 1 and 2. Guide plates 14 acting as a windmill are fixed to the outer plate 13 of the floating chimneys 2 so as to be rotatable rightward. To the lateral wall of the outer plate 13 under the guide plates 14 is fixed a flywheel 10 for stabilizing the rotational speed.

To the upper portion of the rotary shaft 3 is fixed, by means of a support 30, an upper-wind utilizing device 15, to the peripheral wall of which are fixed the same guide plates 34 as those of the embodiment shown in FIG. 5.

The same surface-wind utilizing device 16 as in the embodiment of FIG. 4 is provided on the ground under the floating chimneys. Surface wind blows through this portion in the structure 1.

Three transmission devices 37 are connected to the rotary shaft 3 in the structure 1. Six auxiliary electric power generating devices 33 are provided on both right and left sides of the transmission devices 37. The number of the auxiliary electric power generating devices 33 is automatically selected to brake the rotary shaft 3 in accordance with the rotational speed thereof, thereby stabilizing the rotational speed.

The generated electric energy is charged in two right side and left side batteries 32 under the auxiliary electric power generating devices 33.

On the upper face of the structure 1 are circumferentially arranged floating and guiding superconducting magnets 26, with N poles and S poles alternately arranged. An annular coil 29 with N pole and S poles alternately arranged is provided on the undersurface of the wide upper portion of the rotary shaft 3 so as to face the superconducting magnets 26.

Similarly, other annular coils 29 are provided on the upper, middle and lower portions of the inner side face of the cover 11. Circumferentially arranged accelerating and guiding superconducting magnets 27 are provided on the upper and middle portions of the outer peripheral wall of the structure 1 so as to face the annular coils 29 on the upper and lower portions of the cover 11. Superconducting magnets 28 for generating electric power are provided on the intermediate portion on the inner peripheral wall of the structure 1 between the upper and lower magnets 27.

Superconducting electromagnetic field generating devices 25 electrically connected to the batteries 32, are mounted on those portions of the inner peripheral wall of the structure 1 which the floating and guiding superconducting magnets 26, and the accelerating and guiding superconducting magnets 27 and the electrical power generating superconducting magnets 28 are provided.

The batteries 32 are electrically connected to the coils 29 by means of electricity collecting brushes (not shown). As the rotational speed is increased and the electromagnetic induction occurs to automatically magnetize the coils 29, the supply of the electric energy from the batteries 32 to the coils 29 is terminated. The batteries 32 are also electrically connected to a computer (not shown) provided in the structure 1 so that the switch-over between the N poles and S poles of the floating and accelerating coils 29 is controlled in such a way that the N poles and the S poles of the floating and guiding superconducting magnets 26 are disposed opposite to the N poles and the S poles of the corresponding coils 29, respectively, so that repulsive forces always act between the floating and accelerating superconducting magnets 26 and the corresponding coils 29 to float the rotary shaft 3. On the other hand, attracting and repulsive forces are alternately generated between the N poles and the S poles of the accelerating and guiding superconducting magnets 27 and the coils 29 facing them so as to rotate the rotary shaft 3. Since new strong current is produced due to electromagnetic induction in the electrical power generating coils 29, the batteries 32 can be charged through electricity the collecting brushes (not shown). Alternatively, the generated current may be used for operating other equipment.

In place of the superconducting electromagnetic field generating devices 25 or together therewith, conventional electromagnetic field generating devices may be used.

Transmission devices 17 such as gears are connected to the lower portion of the rotary shaft 3 in the basement 8.

The transmission device 17 on the right side is connected to an air compressor 20. Air compressed by the air compressor 20 passes through a pipe 24 and is jetted from an injecting device 21 provided under the floating chimneys 2.

An auxiliary electric power generating device 18 is connected to the left-side transmission device 17. Electric power generated by the auxiliary electric power generating device 18 is charged in a battery 22.

The battery 22 is electrically connected to an electric motor 19. The transmission device 36 of the electric motor 19 is connected to the transmission device 36 of a corresponding electric power generating device 9. Part of electric energy generated from the electric power generating device 9 and excess electric energy generated therefrom at night time and holidays are stored in the battery 22. The rotational force of the rotary shaft 3 may be directly used as a driving force of the electric power generating device 9. Alternatively, the rotational force of the rotary shaft 3 may be used as a driving force of a water pump or another driving device other than the electric power generator.

The generator according to this invention can be used as an a wind forming apparatus of the chimney of, such as, an incinerator, when the chimney of the apparatus is extended close to the lower ends of the chimneys of the generator of this invention.

Instead of driving the air compressor 20 by means of the transmission device 17, it may be driven by an electric motor (not shown) which is rotated by the battery 22. The battery 22 and the batteries 32 are electrically connected to cooperate with each other.

Technical advantages of this invention are as follows:

Even when there is no wind on the surface of the ground, rising wind generates a rotational force and electric power.

Even when there is no wind at the upper ends of the chimneys, rising wind is accelerated by jetted air.

When the rotational speeds are irregular, a stable rotational force and electric power can be obtained from the batteries.

When a rotational force produced by wind is weak, the electric magnets or superconducting electric magnets other than wind utilizing means can provide a strong rotational force.

The aerogenerator according to this invention can be installed at any possible location. It can be combined with identical aerogenerators of this intention, constituting a large system which can output a required large rotational force or electric power.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A height difference type aerogenerator comprising:
    a structure;
    a vertical rotary shaft having an axis and supported by said structure for rotation about said axis;
    an electric power generating device directly or indirectly connected to said rotary shaft;
    annular concentrically arranged floating chimneys rotatable together with said rotary shaft about said axis; and
    blades fixed to each of said floating chimneys and extending radially of said rotary shaft for rotation with said chimneys and said shaft in response to wind rising within said chimneys.

2. The aerogenerator according to claim 1, further comprising a surface-wind utilizing device provided under said floating chimneys, for changing horizontal wind to rising wind.

3. The aerogenerator according to claim 2, further comprising an upper-wind utilizing device provided by means of a support over said floating chimneys, for rectifying upper wind and preventing rain from entering said floating chimneys.

4. The aerogenerator according to claim 3, further comprising an air compressor driven by said rotary shaft or an electric motor and an injecting device for jetting air compressed by said air compressor at the lower ends of said floating chimneys.

5. The aerogenerator according to claim 1, further comprising an inductive electromagnetic field generating device or a superconducting electromagnetic field generating device for floating and guiding said structure, an inductive electromagnetic field generating device or a superconducting electromagnetic field generating device for accelerating and guiding said rotary shaft, and an inductive electromagnetic field generating device or a superconducting electromagnetic field generating device for generating electric power.

6. The aerogenerator according to claim 5, further providing a lightning arrester provided in said rotary shaft.

* * * * *